United States Patent [19]
Ito et al.

[11] Patent Number: 5,816,555
[45] Date of Patent: Oct. 6, 1998

[54] DRIVING FORCE TRANSMITTING APPARATUS

[75] Inventors: Sadao Ito, Anjo City; Haruo Kato, Kariya City; Masaki Okada, Yokkaichi City, all of Japan

[73] Assignee: Aisin Seiki Kabushiki Kaisha, Japan

[21] Appl. No.: 769,688

[22] Filed: Dec. 18, 1996

[30] Foreign Application Priority Data

Dec. 19, 1995 [JP] Japan ..................................... 7-330810

[51] Int. Cl.⁶ .................................................. F16M 13/00
[52] U.S. Cl. .......................... 248/429; 248/430; 248/424
[58] Field of Search ................................ 248/229.1, 429, 248/430, 424

[56] References Cited

U.S. PATENT DOCUMENTS

| | | | |
|---|---|---|---|
| 4,805,866 | 2/1989 | Aihara et al. | 248/429 |
| 5,048,886 | 9/1991 | Ito et al. | 248/430 |
| 5,222,402 | 6/1993 | White et al. | 248/429 |
| 5,292,164 | 3/1994 | Rees | 248/429 |
| 5,467,957 | 11/1995 | Gauger | 248/429 |

FOREIGN PATENT DOCUMENTS 6-39557  5/1994  Japan .

*Primary Examiner*—Ramon O. Ramirez
*Assistant Examiner*—Willic Berry, Jr.
*Attorney, Agent, or Firm*—Finnegan, Henderson, Farabow, Garrett and Dunner, L.L.P.

[57] ABSTRACT

A driving force transmitting apparatus having a screw for connecting to a motor and a driven member, a nut member in threadable engagement with the screw, a holder containing the nut member for connection to a fixed member, a stopper limiting relative movement between the nut member and the screw, and an elastic member covering the entire outer surface of the nut member so the elastic member and the nut member form a single body.

11 Claims, 4 Drawing Sheets

Fig. 3
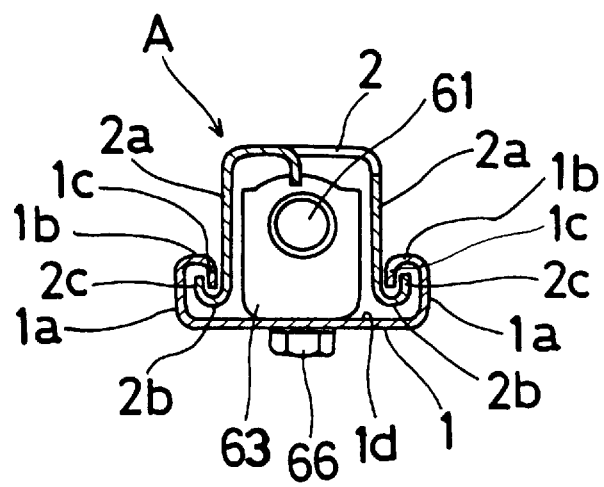
Fig. 4
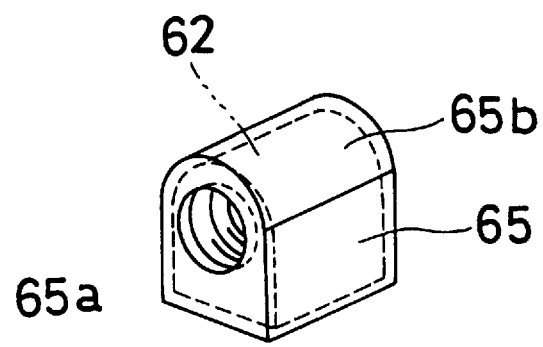
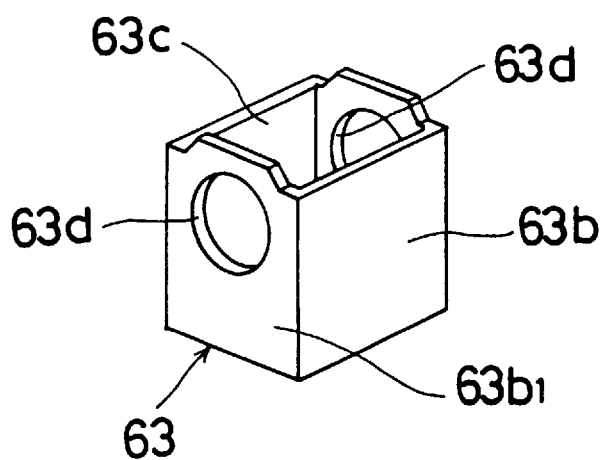

DRIVING FORCE TRANSMITTING APPARATUS

BACKGROUND OF THE INVENTION

1. Field of the Invention

The present invention relates to a driving force transmitting apparatus; and more particularly to an apparatus for transforming rotational movement to linear movement.

While the invention is subject to a wide range of applications, it is especially suited for use in a power seat apparatus for a vehicle; and will be particularly described in that connection.

2. Description of Related Art

A conventional driving force transmitting apparatus is disclosed in Japanese Utility Model Application No. 6-39557. The apparatus comprises a screw connected to a driving member, a nut member connected to a driven member in threadable engagement with the screw, a holder for accommodating the nut member and securing the nut member to the driven member, a stopper for regulating relative movement between the nut member and the screw by contacting the holder on the screw, and an elastic member disposed between the nut member and the holder.

In the conventional apparatus, the elastic member deforms at the portion where the holder contacts the stopper when it regulates the relative movement between the nut member and the screw by the holder contacting the stopper. Therefore, the elastic member prevents the nut member from biting the threads of the screw. However, since the elastic member is disposed only between the nut member and the holder, it causes a large deformation in the compressed portion of the elastic member when the holder contacts the stopper. As a result, the durability of the elastic member is greatly decreased.

In light of the foregoing, there is a need for apparatus that transforms rotational movement to linear movement, and which overcomes the shortcomings of the related art.

SUMMARY OF THE INVENTION

Accordingly, the present invention is directed to an apparatus which has the advantage of reducing deformation of an elastic member which is disposed between the nut member and the holder when the holder contacts the stopper; and also has the advantage of increasing the durability of the elastic member.

An additional advantage of the present invention is the provision of an apparatus having an improved nut member and holder assembly.

A further advantage of the present invention is the provision of an apparatus which generates minimal noise when an upper rail of the seat is moved relative to a lower rail.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages, and in accordance with the purpose of the invention, as embodied and broadly described, the invention is a driving force transmitting apparatus having a screw for connection to a driving member and a driven member, a nut member for connection to another driving member and another driven member in threadable engagement with the screw, a holder accommodating the nut member, a stopper regulating relative movement between the nut member and the screw, and an elastic member covering the surface of the nut member so the elastic member and the nut member are one body.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

In the drawings:

FIG. 3 is a cross-sectional view taken along the line III—III of FIG. 2;

FIG. 4 is an exploded perspective view of the holder and nut member;

DETAILED DESCRIPTION OF THE PREFERRED EMBODIMENTS

Figure 1:
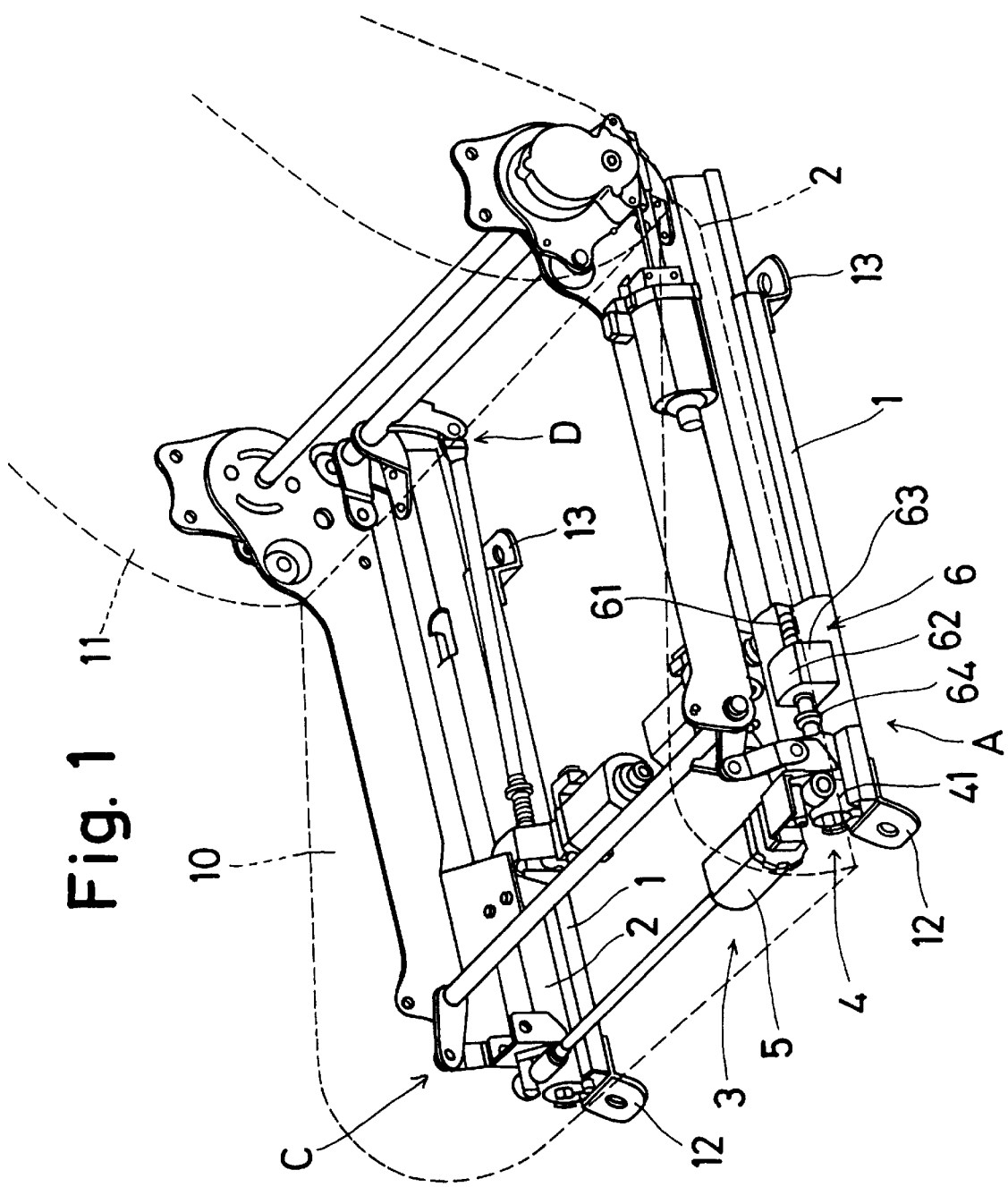
FIG. 1 is a perspective view of a driving force transmitting apparatus adapted to a power seat for a vehicle in accordance with the prevent invention.

Referring to FIG. 1, there is shown a preferred embodiment of a driving force transmitting apparatus, used in a power seat for a vehicle. According to FIG. 1, a seat back 11 is supported by a pair of upper rails 2 via seat reclining mechanism B. The lower rails 1 are secured to a floor of a vehicle at front and rear brackets 12, 13. A seat cushion 10 is supported by the pair of upper rails 2 via a front vertical mechanism C and a rear vertical mechanism D. As is clearly shown in FIG. 3, each upper rail 2 has an inverted U-shaped cross section, and each side plate section 2a is configured with an open end portion at its lower end. The open end portion includes a horizontal portion 2b and a vertical portion 2c to make a U-shaped cross section.

Each lower rail 1 has a U-shaped cross section and its open end portion is made by a side plate section 1a at its upper end. The open end portion of the lower rail 1 further includes a horizontal portion 1b and a vertical portion 1c to make an inverted U-shaped cross section. Each upper rail 2 is slidably movable on each lower rail 1.

A driving mechanism 3 is disposed between each one of the pair of lower and upper rails 1 and 2, respectively, at one end thereof, and slidably moves the upper rail 2 relative to the lower rail 1. A seat sliding mechanism A includes the lower rail 1, the upper rail 2 and the driving mechanism 3.

Figure 2:
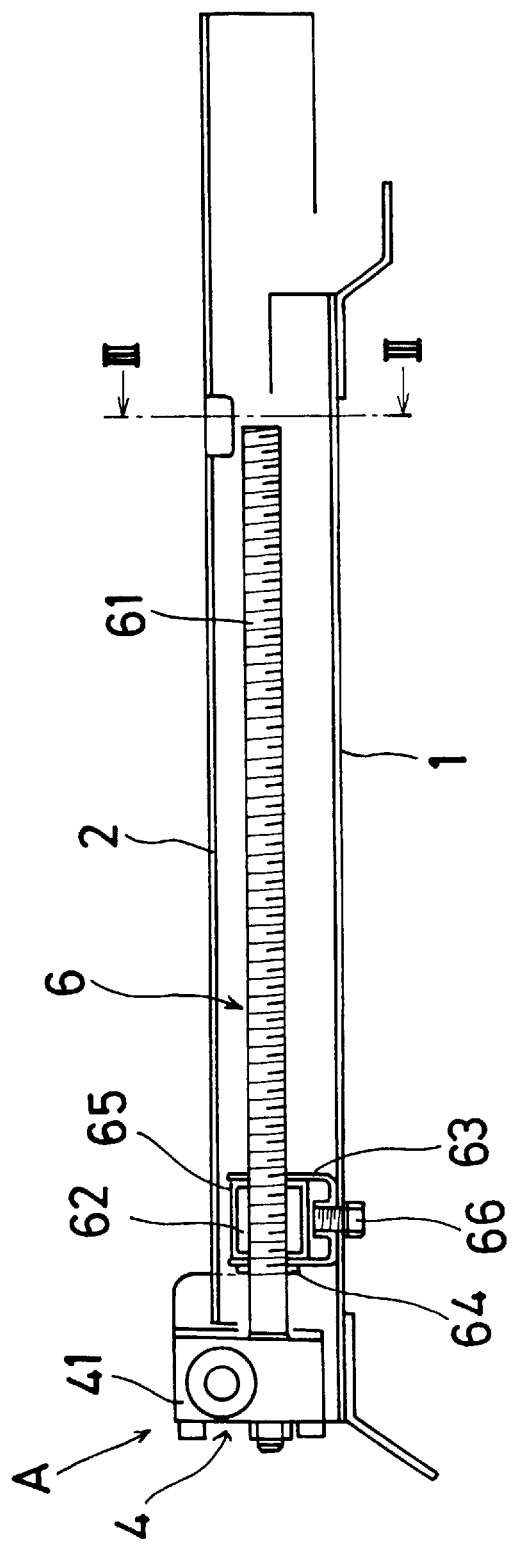
FIG. 2 is a partial longitudinal-sectional view of one side rail of the power seat of FIG. 1 in accordance with the present invention.

As shown in FIG. 1 and FIG. 2, the driving mechanism 3 comprises a speed reducing gear mechanism 4 secured to the upper rail 2, a motor 5 secured to the upper rail 2 by a receiving box 41 of the speed reducing gear mechanism 4 and an output axis of the motor 5 connects to an input gear (not shown) of the speed reducing gear mechanism 4. A driving force transmitting apparatus 6 mainly comprises a screw 61 connected to the motor 5 via the speed reducing gear mechanism 4, all of which are rotatably supported by the upper rail 2; and a nut member 62, which threadably engages the screw 61, and is secured to the lower rail 1 by a bolt 66.

As shown in FIG. 2 and FIG. 3, the screw 61 is disposed parallel in a longitudinal direction of the rails 1, 2 and within a closed space formed by the rails 1, 2, as seen in cross section. The screw 61 is connected to an output gear (not shown) of the speed reduction gear mechanism 4 in the receiving box 41. The receiving box 41 is secured to the upper rail 2. The speed reducing gear mechanism 4 is driven by the motor 5. Thereby the upper rail 2 is able to move relative to the lower rail 1 in the longitudinal direction of the rails 1, 2. Although the nut member 62 threadably engages the screw 61, it is connected to and supported by the lower rail 1 via a holder 63, and thus is not able to rotate. A stopper 64 is provided in the vicinity of one end of the screw 61.

Figure 5:
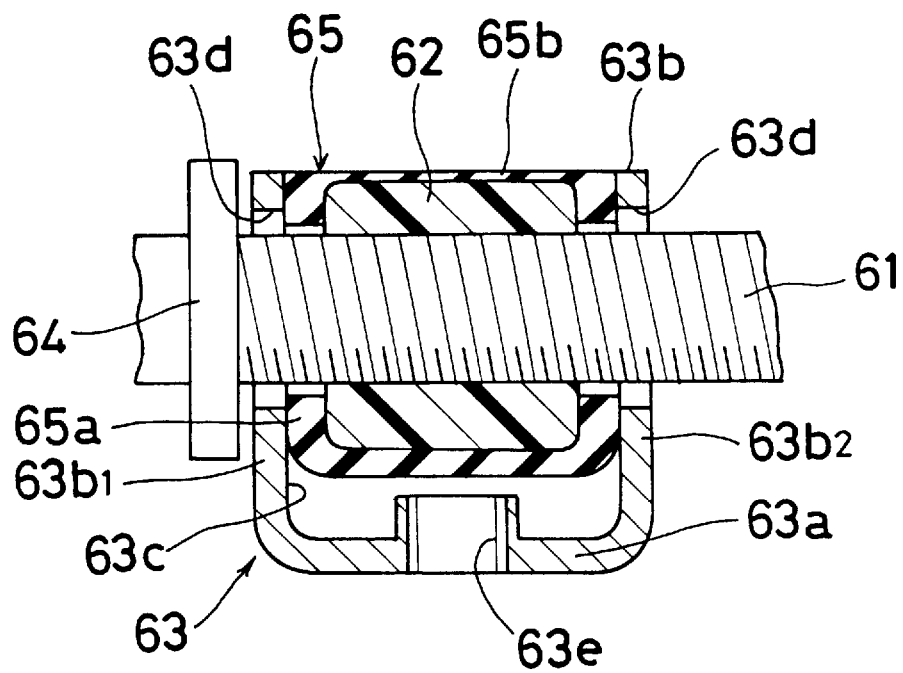
FIG. 5 is a fragmentary sectional view of the apparatus with the holder out of contact with the stopper in accordance with the present invention.

As shown in FIG. 4 and FIG. 5, the holder 63 is made of metal materials. The holder 63 has a bottom wall 63a, a box-shaped perimeter or surrounding wall 63b and a receiving space 63c within the perimeter wall 63b. Two opposite walls 63b1, 63b2 of the perimeter wall 63 each has a hole 63d in the center. The bottom wall 63a is provided with a threaded hole 63e. The nut member 62 is made from a resin material and is cube-shaped. The nut member 62 having an outer rubber cushion 65 is inserted into the receiving space 63c of the holder 63. The nut member 62, the surface of which surface is covered with the rubber cushion 65 is unable to rotate in the holder 63. The holder 63 is secured to the lower rail 2 by a bolt 66 which is threaded into the hole 63e. Therefore, the nut member 62 is supported by the lower rail 1 without being able to rotate. The screw 61 is threadably inserted into the nut member 62 through the central holes 63d of the holder 63.

The rubber cushion 65 is formed around the nut member 62, and covers the entire outer surface of the nut member 62 to form one body. This cushioned surface 65 may be formed by molding, dipping or coating the nut member 62, for example. The nut member 62 is made of a resin material and has a higher forming or solidifying temperature than the material of the rubber cushion 65 in order to be molded in, coated by, or dipped in the material forming the rubber cushion 65. The rubber cushion 65 is made of a thermoplastic elastomer resin.

Because the rubber cushion 65 is formed around the nut member 65 in a single body, the accumulation of manufacturing or measuring tolerances of individual members is able to be prevented. Therefore, rattling also is able to be prevented, which may occur between the holder 63 and the nut member 62 when appropriately assembled. The present invention also reduces the number of parts of the assembly, and permits ease of assembly of the nut member 62 into the holder 63. Furthermore, the thickness of the rubber cushion 65 is able to be set as desired in accordance with the space between the holder 63 and the nut member 62.

In operation, the screw 61 is rotated by motor rotating torque via the speed reducing gear mechanism 4 when the motor 5 is operating. The nut member 62 is urged in the longitudinal direction by the rotation of the screw 61. At this time, the screw 61 is moved relative to the lower rail 1 in the longitudinal direction of the rails 1, 2 since the nut member 62 is secured to the lower rail 1. As a result, the upper rail 2 moves slidably in the longitudinal direction of the rails 1, 2, to adjust the seat in a forward and a backward position.

Figure 6:
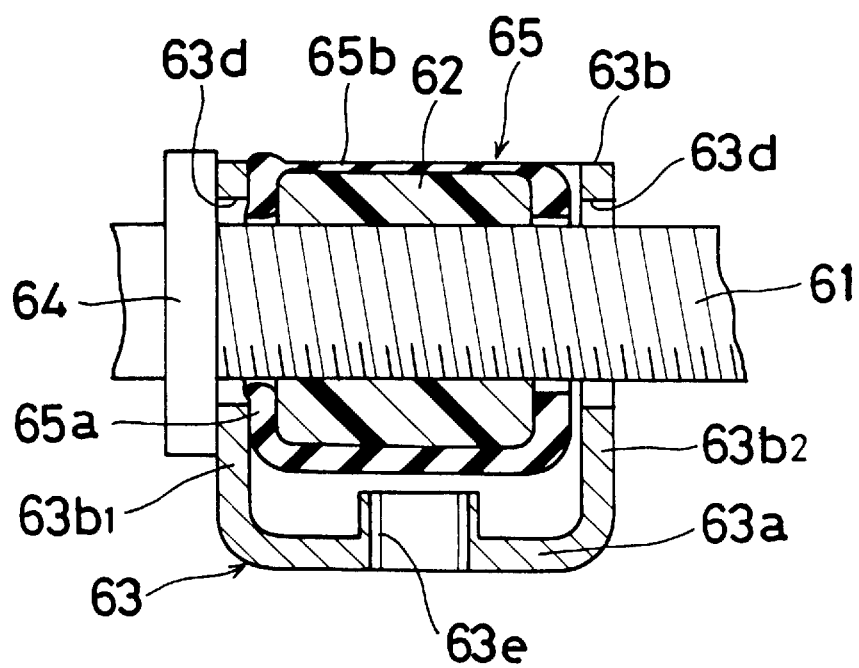
FIG. 6 is a fragmentary sectional view of the apparatus with the holder and elastic nut member in an operating condition where the holder is in contact with the stopper in accordance with the present invention.

As shown in FIG. 6, the wall 63b1 of the perimeter opposite wall 63b2 of the holder 63 contacts the stopper 64 when the seat moves to the most rearward position. In this way the stopper is able to regulate or limit relative movement between the screw 61 and the nut member 62. In this condition, the perimeter wall 63b1 engages stopper 64, and the portion 65a of the cushion rubber 65 is in compressed contact with the wall 63b1 of the holder. The rubber cushion 65 prevents the screw 61 from binding the nut member 62 by the transformation of an elastic force of the rubber cushion 65. Because the rubber cushion 65 and the nut member 62 are one body, deformation of the cushion 65 between the nut and the portion of the holder neighboring the hole 63d is reduced.

It will be apparent to those skilled in the art that various modifications and variations can be made in the apparatus of the present invention without departing from the spirit or scope of the invention. Thus, it is intended that the present invention cover the modifications and variations of this invention provided they come within the scope of the appended claims and their equivalents.

What is claimed is:

1. A driving force transmitting apparatus, comprising:
   a screw for connection to a driving member and a driven member,
   a nut member in threadable engagement with the screw, said nut member having an outer surface,
   a holder, containing the nut member, for connection to a fixed member,
   a stopper limiting relative movement between the holder containing the nut member and the screw, and
   an elastic member covering the outer surface of the nut member so the elastic member and the nut member are a single one piece body.

2. A driving force transmitting apparatus according to claim 1, wherein the stopper is disposed adjacent one end of the screw.

3. A driving force transmitting apparatus according to claim 2, wherein the the holder has a substantially rectangular perimeter wall, and the elastic covered nut member, is contained within the holder and non-rotatable relative thereto.

4. A driving force transmitting apparatus according to claim 3, wherein the nut member is comprised of a resin material.

5. A driving force transmitting apparatus according to claim 4, wherein the resin material of the nut member has a higher solidifying temperature than the material of the elastic covering.

6. A driving force transmitting apparatus for a vehicle seat, comprising:
   a pair of lower rails for securing to a floor of a vehicle,
   a pair of upper rails mounted on the lower rail and slidably movable relative to the lower rail,
   a seat cushion supported by the upper rails,
   a seat reclining mechanism supporting a seat back and rotating relative to the seat cushion,
   a screw connected to one of the upper and lower rails,
   a nut member, having an outer surface, said nut member being threadably mounted on the screw,
   a holder accommodating the nut member, said holder being connected to the other of the upper and lower rails, a stopper limiting relative movement between the nut member and the screw, and an elastic member covering the outer surface of the nut member so the elastic member and the nut member are a single body.

7. A driving force transmitting apparatus for a vehicle seat according to claim 6, wherein the stopper is disposed adjacent one end of the screw.

8. A driving force transmitting apparatus for a vehicle seat according to claim 7, wherein the holding member has perimeter walls substantially rectangular to one another, and the elastic covered nut member is inserted into the holder.

9. A driving force transmitting apparatus for a vehicle seat according to claim 8, wherein the nut member is comprised of resin material.

10. A driving force transmitting apparatus for a vehicle seat according to claim 9, wherein the resin material of the nut member has a higher solidifying temperature than the material of the elastic member.

11. A driving force transmitting apparatus, comprising:

a pair of lower rails for securing to a floor of a vehicle, a pair of upper rails slidably mounted on the lower rail, a screw connected to one of the upper and lower rails, a nut member threadably engaging the screw, said nut member having an outer surface, a holder, containing the nut member, for connection to the other of the upper and lower rails, said holder limiting rotation of the nut member relative thereto, a stopper limiting relative movement between the nut member and the screw, and an elastic member covering the outer surface of the nut member so the elastic member and the nut member are a single body.

* * * * *